US009645275B2

(12) United States Patent
Kumar et al.

(10) Patent No.: US 9,645,275 B2
(45) Date of Patent: May 9, 2017

(54) INTEGRATED DIP FROM 3D RESISTIVITY TOOL AND BOREHOLE IMAGING TOOL

(71) Applicant: Schlumberger Technology Corporation, Sugar Land, TX (US)

(72) Inventors: Anish Kumar, Katy, TX (US); Ronald S. Hayden, Katy, TX (US); George Richard Kear, Conway, AR (US); Jeffrey Mark Grant, Sugar Land, TX (US); Elizabeth Ruiz, Sugar Land, TX (US); Souvick Saha, Katy, TX (US); Bill Newberry, Sugar Land, TX (US); Raja Shahnawaz Khan, Houston, TX (US); Steven Eugene Alderman, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1091 days.

(21) Appl. No.: 13/622,672

(22) Filed: Sep. 19, 2012

(65) Prior Publication Data
US 2013/0080059 A1    Mar. 28, 2013

Related U.S. Application Data

(60) Provisional application No. 61/538,043, filed on Sep. 22, 2011.

(51) Int. Cl.
*G01V 3/18* (2006.01)
*G06F 19/00* (2011.01)
(Continued)

(52) U.S. Cl.
CPC .............. *G01V 3/20* (2013.01); *E21B 47/026* (2013.01); *G01V 3/28* (2013.01); *G06T 17/05* (2013.01)

(58) Field of Classification Search
CPC ... G01V 3/38; G01V 3/26; G01V 3/30; G01V 3/28; G01V 3/20; G01V 2210/665;
(Continued)

(56) References Cited

U.S. PATENT DOCUMENTS 4,344,142 A * 8/1982 Diehr, II ............. B29C 35/0288
264/325
5,798,982 A  8/1998 He et al.
(Continued)

FOREIGN PATENT DOCUMENTS

WO    9947947 A1   9/1999
WO    2011022012 A1   2/2011
(Continued)

OTHER PUBLICATIONS

Wu et al., Determining Formation DIP from a Fully Triaxial Induction Tool, Jun. 2010, SPWLA, p. 1-16.*
(Continued)

*Primary Examiner* — John Breene
*Assistant Examiner* — Mohammad Islam
(74) *Attorney, Agent, or Firm* — Mitchell M. Blakely (57) ABSTRACT

A method for determining a dip of a geological structure in a subterranean formation, involves generating, using a 3D resistivity analyzer, a first intermediate result describing the dip of the geological structure based on 3D resistivity data collected from a borehole penetrating the subterranean formation. The method further involves generating, using a borehole image analyzer, a second intermediate result describing the dip of the geological structure based on a borehole image collected from the borehole. The method further involves generating, by a computer processor combining the first intermediate result and the second intermediate result based on a pre-determined criterion, an integrated result describing the dip of the geological structure.

24 Claims, 6 Drawing Sheets

(51) Int. Cl.
*G01V 3/20* (2006.01)
*G01V 3/28* (2006.01)
*G06T 17/05* (2011.01)
*E21B 47/026* (2006.01)

(58) Field of Classification Search
CPC ...... G06F 15/00; E21B 49/00; E21B 47/0002; E21B 47/082; G06T 17/05
USPC .............................. 702/7, 9, 6, 11; 324/338
See application file for complete search history.

(56) References Cited

U.S. PATENT DOCUMENTS

| | | | | |
|---|---|---|---|---|
| 6,285,026 | B1* | 9/2001 | Evans et al. | 250/269.4 |
| 6,384,605 | B1* | 5/2002 | Li | 324/338 |
| 7,640,111 | B2 | 12/2009 | Kear et al. | |
| 2003/0105591 | A1* | 6/2003 | Hagiwara | 702/7 |
| 2003/0164706 | A1* | 9/2003 | Iwanicki et al. | 324/375 |
| 2004/0136267 | A1 | 7/2004 | Kear et al. | |
| 2004/0138819 | A1* | 7/2004 | Goswami et al. | 702/10 |
| 2007/0169401 | A1* | 7/2007 | Chyun | A01M 1/145 43/113 |
| 2008/0297510 | A1 | 12/2008 | Callegari | |
| 2009/0192713 | A1* | 7/2009 | Fang | E21B 47/026 702/7 |
| 2009/0259446 | A1* | 10/2009 | Zhang et al. | 703/2 |
| 2010/0010745 | A1* | 1/2010 | Thorne | 702/11 |
| 2011/0098929 | A1* | 4/2011 | Tabanou | G01V 3/083 702/7 |
| 2011/0254552 | A1* | 10/2011 | Wu | G01V 3/28 324/339 |
| 2011/0255370 | A1* | 10/2011 | Hirabayashi | G01V 1/284 367/31 |
| 2011/0282634 | A1* | 11/2011 | Marza | G06T 17/05 703/2 |
| 2012/0026832 | A1* | 2/2012 | Pepper | G01V 1/301 367/43 |
| 2012/0253676 | A1* | 10/2012 | Dong | G01V 3/38 702/7 |

FOREIGN PATENT DOCUMENTS

| | | |
|---|---|---|
| WO | 2011031329 A2 | 3/2011 |
| WO | 2011049916 A2 | 4/2011 |

OTHER PUBLICATIONS

Alice Corporation, Court Decision, 2013.*
Cheung, et al., "Field Test Results of a New Oil-Base Mud Formation Imager Tool", SPWLA 42nd Annual Logging Symposium, Jun. 17-20, 2001: pp. 1-14.
Wang, et al., "Determining Anisotropic Formation Resistivity at Any Relative Dip Using a Multiarray Triaxial Induction Tool", SPE 103113, 2006 Annual Technical Conference and Exhibition, Sep. 24-27, 2006, San Antonio, Texas, pp. 1-13, Society of Petroleum Engineers.
Wu, et al., "Determining Formation Dip From a Fully Triaxial Induction Tool", SPWLA 51st Annual Logging Symposium, Jun. 19-23, 2010, Perth, Australia, pp. 1-16, Society of Petrophysicists and Well Log Analysts.
International Search Report and Written Opinion of PCT Application No. PCT/US2012/05619 dated Feb. 28, 2013: pp. 1-9.
Search Report issued in EP application 12834035.3 on Jul. 6, 2015, 4 pages.

* cited by examiner

INTEGRATED DIP FROM 3D RESISTIVITY TOOL AND BOREHOLE IMAGING TOOL

CROSS REFERENCE TO RELATED APPLICATIONS

This application claims priority under 35 U.S.C. §119 from Provisional Patent Application No. 61/538,043 filed Sep. 22, 2011, with common inventors.

BACKGROUND

Operations, such as geophysical surveying, drilling, logging, well completion, and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

The term "dip" refers to a characteristic (or a measurement thereof) of a geological structure, such as a bed, fracture, fault, etc. in a subterranean formation or surface exposure. In particular, dip magnitude represents an angle between the geological structure (i.e., geological surface) and an imaginary horizontal plane while dip azimuth represents a direction of the dipping geological structure. One way to determine dips of subterranean formation is from dipmeter/borehole image data. For example, U.S. Pat. No. 7,640,111 B2 and P. Cheung et al., "Field Test Results of a New Oil-base Mud Formation Imager Tool," SPWLA 42$^{nd}$ Annual Logging Symposium, Jun. 17-20, 2001 describe Oil Based Mud Imaging (OBMI) techniques for obtaining borehole images, which are then used to determine dips. Borehole imaging tool may also include density imaging tool, acoustic imaging tool, gamma-ray imaging tool, photoelectric factor imaging tool, etc. that generates various types of borehole images. In addition, example techniques for determining formation dip are described in U.S. Patent Publication No. 2004/0136267 A1; P. Wu et al., "Determining Formation Dip from a Fully Triaxial Induction Tool," SPWLA 51$^{st}$ Annual Logging Symposium, Jun. 19-23, 2010; and Hanming Wang et al., "Determining Anisotropic Formation Resistivity at Any Relative Dip using a Multiarray Tiaxial Induction Tool," SPE 103113, 2006 SPE Annual Technical Conference and Exhibition, Sep. 24-27, 2006. The triaxial induction resistivity tool is also known to those skilled in the art as the 3D resistivity tool.

SUMMARY

In general, in one aspect, the invention relates to a method for determining a dip of a geological structure in a subterranean formation. The method includes generating, using a 3D resistivity analyzer, a first intermediate result describing the dip of the geological structure based on 3D resistivity data collected from a borehole penetrating the subterranean formation, generating, using a borehole image analyzer, a second intermediate result describing the dip of the geological structure based on a borehole image collected from the borehole, and generating, by a computer processor, combining the first intermediate result and the second intermediate result based on a pre-determined criterion, an integrated result describing the dip of the geological structure. Further, generating the integrated result includes calculating a geologic index value associated with the 3D resistivity data to determine whether the geologic index value is less than a first pre-determined threshold, wherein the geologic index value represents a measure of dimensionality of the geological structure, including, when the geologic index value within a first portion of the borehole is less than the first pre-determined threshold, the first intermediate result for the first portion of the borehole in the integrated result, and excluding, when the geologic index value within a second portion of the borehole exceeds the first pre-determined threshold, the first intermediate result for the second portion of the borehole from the integrated result.

Other aspects of the invention will be apparent from the following detailed description and the appended claims.

BRIEF DESCRIPTION OF DRAWINGS

The appended drawings illustrate several embodiments of determining formation dip using 3D resistivity tool and borehole imaging tool and are not to be considered limiting of its scope, for determining formation dip using 3D resistivity tool and borehole imaging tool may admit to other equally effective embodiments.

FIG. 1.1 is a schematic view, partially in cross-section, of a field in which one or more embodiments of determining formation dip using 3D resistivity tool and borehole imaging tool may be implemented.

FIG. 1.2 shows an integrated dip determination system in accordance with one or more embodiments.

FIGS. 2.1 and 2.2 depict flowcharts of example methods for determining formation dip using 3D resistivity tool and borehole imaging tool in accordance with one or more embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium for determining formation dip using 3D resistivity tool and borehole imaging tool. Specifically, embodiments of the invention use at least a geologic index value to determine when to include output from the 3D resistivity tool and borehole imaging tool. In one or more embodiments, the borehole imaging tool may be a micro-resistivity imaging tool such as OBMI/FMI (Oil Based Mud Imager/Fullbore Formation Micro Imager), which is a commercial tool provided by Schlumberger Technology Corporation, Houston, Tex. that uses an example micro-resistivity imaging technique. In one or more embodiments, the 3D resistivity tool may be RT Scanner, which is a commercial 3D resistivity tool provided by Schlumberger Technology Corporation, Houston, Tex. that uses the techniques described in P. Wu et al., "Determining Formation Dip from a Fully Triaxial Induction Tool," SPWLA 51$^{st}$ Annual Logging Symposium, Jun. 19-23, 2010 and Hanming Wang et al. "Determining Anisotropic Formation Resistivity at Any Relative Dip using a Multiarray Tiaxial Induction Tool," SPE 103113, 2006 SPE Annual Technical Conference and Exhibition, Sep. 24-27, 2006.

Figure 11:
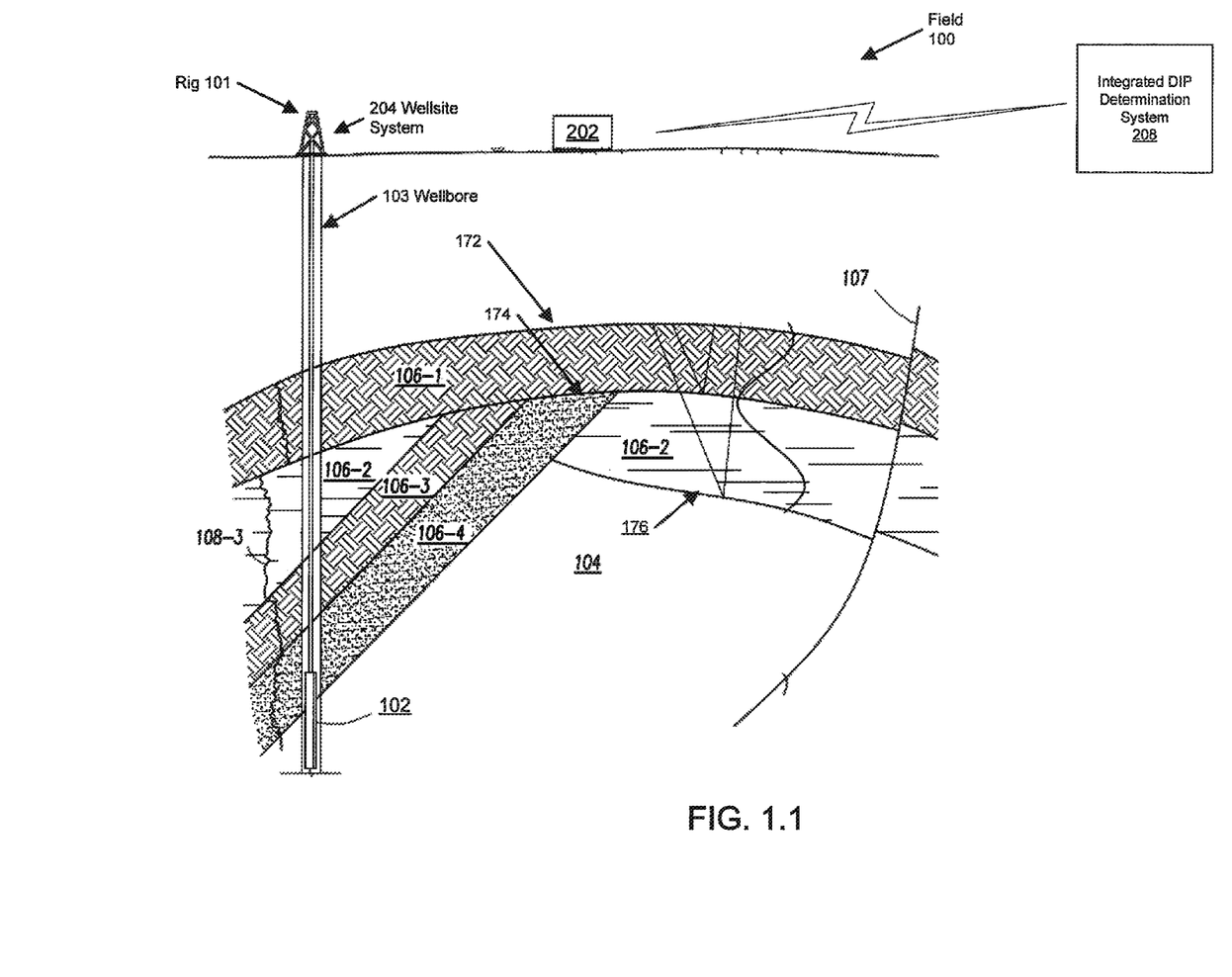

FIG. 1.1 depicts a schematic view, partially in cross section, of a field (100) in which one or more embodiments of determining formation dip using 3D resistivity tool and borehole imaging tool may be implemented. In one or more embodiments, one or more of the modules and elements shown in FIG. 1.1 may be omitted, repeated, and/or substituted. Accordingly, embodiments of determining formation dip using 3D resistivity tool and borehole imaging tool should not be considered limited to the specific arrangements of modules shown in FIG. 1.1.

As shown in FIG. 1.1, the subterranean formation (104) includes several geological structures (106-1 through 106-4). As shown, the formation has a sandstone layer (106-1), a limestone layer (106-2), a shale layer (106-3), a sand layer (106-4), and a plurality of horizons (172, 174, 176). A fault line (107) extends through the formation. In one or more embodiments, various survey tools and/or data acquisition tools are adapted to measure the formation and detect the characteristics of the geological structures of the formation. Throughout this disclosure, the terms "geological structure" and "geological surface" may be used interchangeably depending on the context.

As shown in FIG. 1.1, the wellsite system (204) is associated with a rig (101), a wellbore (103), and other wellsite equipment and is configured to perform wellbore operations, such as logging, drilling, fracturing, production, or other applicable operations. Generally, survey operations and wellbore operations are referred to as field operations of the field (100). These field operations are typically performed as directed by the surface unit (202).

In one or more embodiments, the surface unit (202) is operatively coupled to the wellsite system (204). In particular, the surface unit (202) is configured to communicate with the data acquisition tool (102) to send commands to the data acquisition tool (102) and to receive data therefrom. For example, the data acquisition tool (102) may be adapted for measuring downhole properties using wireline tools or using logging-while-drilling ("LWD") tools. In one or more embodiments, surface unit (202) may be located at the wellsite system (204) and/or remote locations. The surface unit (202) may be provided with computer facilities for receiving, storing, processing, and/or analyzing data from the data acquisition tool (102) or other part of the field (104). The surface unit (202) may also be provided with or functionally for actuating mechanisms at the field (100). The surface unit (202) may then send command signals to the field (100) in response to data received, for example to control and/or optimize various field operations described above.

In one or more embodiments, the data received by the surface unit (202) represents characteristics of the subterranean formation (104) and may include information related to porosity, saturation, permeability, natural fractures, stress magnitude and orientations, elastic properties, formation dip, etc. during a drilling, fracturing, logging, or production operation of the wellbore (103) at the wellsite system (204). For example, data plot (108-3) may be a wireline log, which is a measurement of a formation property as a function of depth taken by an electrically powered instrument to infer properties and make decisions about drilling and production operations. The record of the measurements, typically on a long strip of paper or in a digital file, may also be referred to as a log. Measurements obtained by a wireline log may include resistivity measurements obtained by a resistivity measuring tool, such as a 3D resistivity measuring tool or a micro-resistivity measuring tool.

In one or more embodiments, the surface unit (202) is communicatively coupled to an integrated dip determination system (208). In one or more embodiments, the data received by the surface unit (202) may be sent to the integrated dip determination system (208) for further analysis. Generally, the integrated dip determination system (208) is configured to determine formation dips based on the data provided from the surface unit (202). In one or more embodiments, the integrated dip determination system (208) is provided with functionality for manipulating and analyzing the data, such as performing micro-resistivity image (or other types of borehole images) interpretation or triaxial induction data (i.e, 3D resistivity data) analysis to identify geological surfaces in the subterranean formation (104) and determining dips thereof. In one or more embodiments, the result generated by the integrated dip determination system (208) may be displayed for user viewing using a two dimensional (2D) display, three dimensional (3D) display, or other suitable displays. Although the surface unit (202) is shown as separate from the integrated dip determination system (208) in FIG. 1.1, in other examples, the surface unit (202) and the integrated dip determination system (208) may also be combined.

Figure 12:
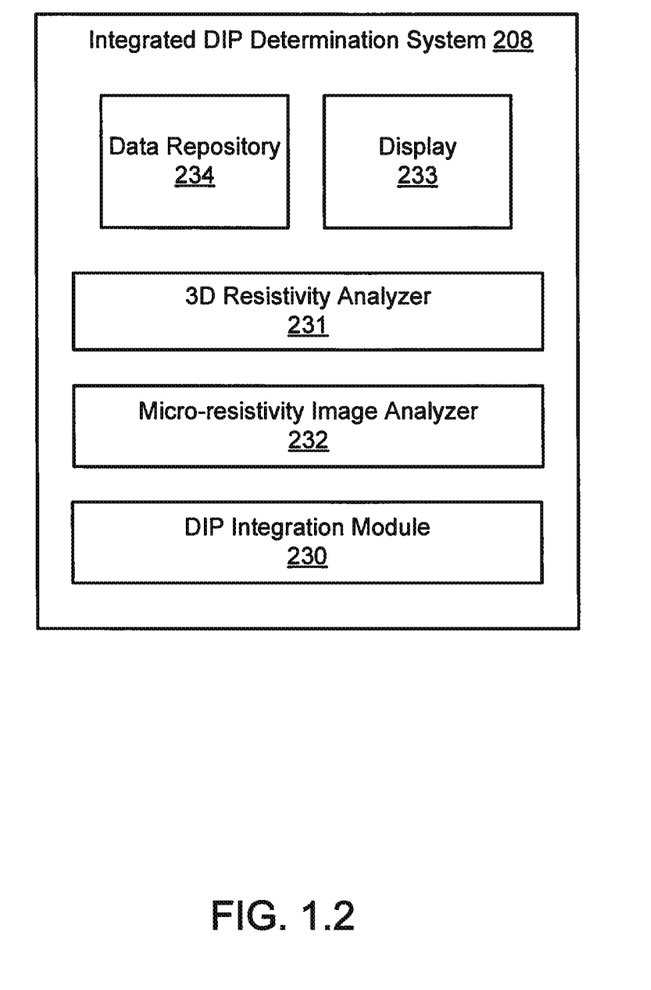

FIG. 1.2 shows more details of the integrated dip determination system (208) in which one or more embodiments of determining formation dip using 3D resistivity tool and borehole imaging tool may be implemented. In one or more embodiments, one or more of the modules and elements shown in FIG. 1.2 may be omitted, repeated, and/or substituted. Accordingly, embodiments of determining formation dip using 3D resistivity tool and borehole imaging tool should not be considered limited to the specific arrangements of modules shown in FIG. 1.2.

As shown in FIG. 1.2, the integrated dip determination system (208) includes 3D resistivity analyzer (231), micro-resistivity image analyzer (232), dip integration module (230), data repository (234), and display (233). Each of these elements is described below.

In one or more embodiments, the 3D resistivity analyzer (231), micro-resistivity image analyzer (232), and dip integration module (230), include software instructions stored in a memory and executing on a processor to communicate with the surface unit (202) for receiving data therefrom and to determine formation dips based on the received data. For example, the received data may be stored in the data repository (234) to be processed by the 3D resistivity analyzer (231), micro-resistivity image analyzer (232), and dip integration module (230). The data repository (234) (and/or any portion of data stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (234) may be a device internal to the integrated dip determination system (208). Alternatively, the data repository (234) may be an external storage device operatively connected to the integrated dip determination system (208).

In one or more embodiments, results generated by the 3D resistivity analyzer (231), micro-resistivity image analyzer (232), and dip integration module (230) are displayed to the user using the display (233). In one or more embodiments, the display (233) may be a 2D display, a 3D display, or other suitable display device. The processor and memory of the integrated dip determination system (208) are not explicitly depicted in FIG. 1.2 so as not to obscure other elements of the integrated dip determination system (208). An example of such processor and memory is described in reference to FIG. 4 below.

In one or more embodiments, the 3D resistivity analyzer (231) is configured to generate formation dip by analyzing 3D resistivity data (also known as triaxial induction data) collected using the data acquisition tool (102) and received from the surface unit (202). For example, the 3D resistivity analyzer (231) may be configured with functionalities described in P. Wu et al., "Determining Formation Dip from a Fully Triaxial Induction Tool," SPWLA 51st Annual Logging Symposium, Jun. 19-23, 2010 and Hanming Wang et al., "Determining Anisotropic Formation Resistivity at Any Relative Dip using a Multiarray Tiaxial Induction Tool," SPE 103113, 2006 SPE Annual Technical Conference and Exhibition, Sep. 24-27, 2006. In one or more embodiments, the data acquisition tool (102) includes the aforementioned RT scanner where the 3D resistivity data is referred to as RT scanner data.

In one or more embodiments, the micro-resistivity image analyzer (232) is configured to generate formation dip by analyzing micro-resistivity images collected using the data acquisition tool (102) and received from the surface unit (202). Micro-resistivity images (e.g., based on water-base mud or oil-base mud), allow visualization of the borehole rock and, therefore, geological interpretation. The micro-resistivity images have high vertical and horizontal resolution, and allow the user to obtain dip of formation features, including bedding, fractures, etc. These formation features are observed by contrasts between the formation feature and the surrounding rock, often at the scale of the image resolution (e.g, few millimeters or tenths of inches). For example, the micro-resistivity image analyzer (232) may be configured with functionalities described in U.S. Pat. No. 7,640,111 B2, U.S. Patent Publication No. 2004/0136267 A1, and P. Cheung et al., "Field Test Results of a New Oil-base Mud Formation Imager Tool," SPWLA 42$^{nd}$ Annual Logging Symposium, Jun. 17-20, 2001. In one or more embodiments, the data acquisition tool (102) includes the aforementioned OBMI/FMI where the micro-resistivity image is referred to as OBMI/FMI data. In one or more embodiments, the data acquisition tool (102) may include other type of borehole imaging tool, such as the density imaging tool, acoustic imaging tool, gamma-ray imaging tool, photo-electric factor imaging tool, etc. that generates various types of borehole images. In one or more embodiments, the micro-resistivity image may be substituted by a different type of borehole image. Accordingly, the micro-resistivity image analyzer (232) may be substituted by a different type of borehole image analyzer.

In one or more embodiments, the dip integration module (230) is configured to analyze and combine intermediate results of formation dip as determined by the 3D resistivity analyzer (231) and the micro-resistivity image analyzer (232). In one or more embodiments, dips with the highest degree of confidence are selected from the result of 3D resistivity data (e.g., RT scanner data) and/or the micro-resistivity image (e.g., OBMI/FMI data) and integrated to create a new data set, or both sets of dips can be used in combination to provide an enhanced and more accurate interpretation. Specifically, in one or more embodiments, the result from the 3D resistivity data is a first intermediate result. Similarly, the result from the micro-resistivity image is a second intermediate result. The first intermediate result and the second intermediate result are integrated to generate an integrated result. For example, in highly anisotropic lithology, such as shales with interbedding and some sandstones with shale interbeds), inversion processing of the 3D resistivity data generates high quality formation dip information. In one or more embodiments, the dip information from the 3D resistivity data is used for deepwater wells where the micro-resistivity images may be deteriorated in shales due to mud induced fractures or borehole rugosity.

In one or more embodiments, the dip integration module (230) uses several pre-determined criteria and automatically selects the best of the dips from the 3D resistivity data and the micro-resistivity images without user intervention. In one or more embodiments, the pre-determined criteria are formulated prior to analyzing the 3D resistivity data and the micro-resistivity data and are based on one or more of (i) a geologic index value associated with the 3D resistivity data, where the geologic index is an attribute of a misfit curve output of the 3D resistivity tool. The misfit curve indicates departure from one-dimensionality of the formation. Higher values (i.e., departure from one-dimensionality) of the geologic index indicate that the formation has been affected by geological energy. Therefore, the misfit curve is also known as the geologic index curve, geological energy curve, or heterogeneity index curve. In other words, the geologic index value represents a measure of dimensionality of the geological structure, (ii) a ratio of a perpendicular (to formation) component of the 3D resistivity data to a parallel (to formation) component of the 3D resistivity data, where the ratio represents a measure of anisotropy in the subterranean formation, (iii) a caliper curve of the borehole, where a borehole integrity measure derived from the caliper curve (indicating competency or deterioration of the borehole wall, such as washed out, spiraling, or rugose (uneven), etc.) correlates with a quality level of the micro-resistivity image, and (iv) comparing the dip information from the 3D resistivity data and the dip information from the micro-resistivity image, where a consistency measure of the comparison represents matching between the two sources of dip information regardless of the resolution differences therebetween.

In one or more embodiments, the integrated dip procedure uses both dips from both sources keeping both sets and using their similarities or differences to make enhanced interpretations. Through the interpretation process using the dip integration module (230), a geologist could use the dip sets and quality control curves from both the 3D resistivity analyzer (231) and the micro-resistivity image analyzer (232) and determine final dips for formation bedding, and/or fractures and or other geologic phenomenon. In one or more embodiments, one or more of the geologic index value associated with the 3D resistivity data, the ratio of a perpendicular (to formation) component of the 3D resistivity data to a parallel (to formation) component of the 3D resistivity data, and the caliper curve of the borehole are displayed (i.e., using the display (233)) in a correlated manner along with the dips from the 3D resistivity data and the micro-resistivity images in the interpretation process.

Figure 21:
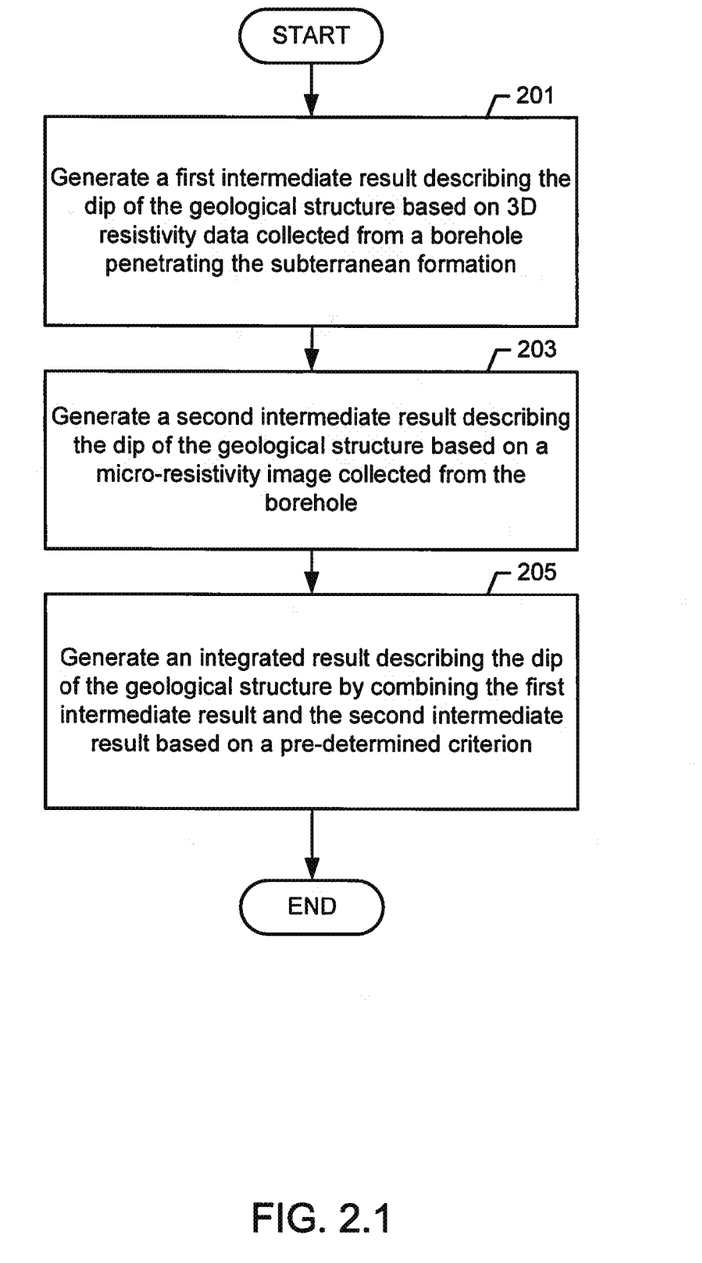
Figure 22:
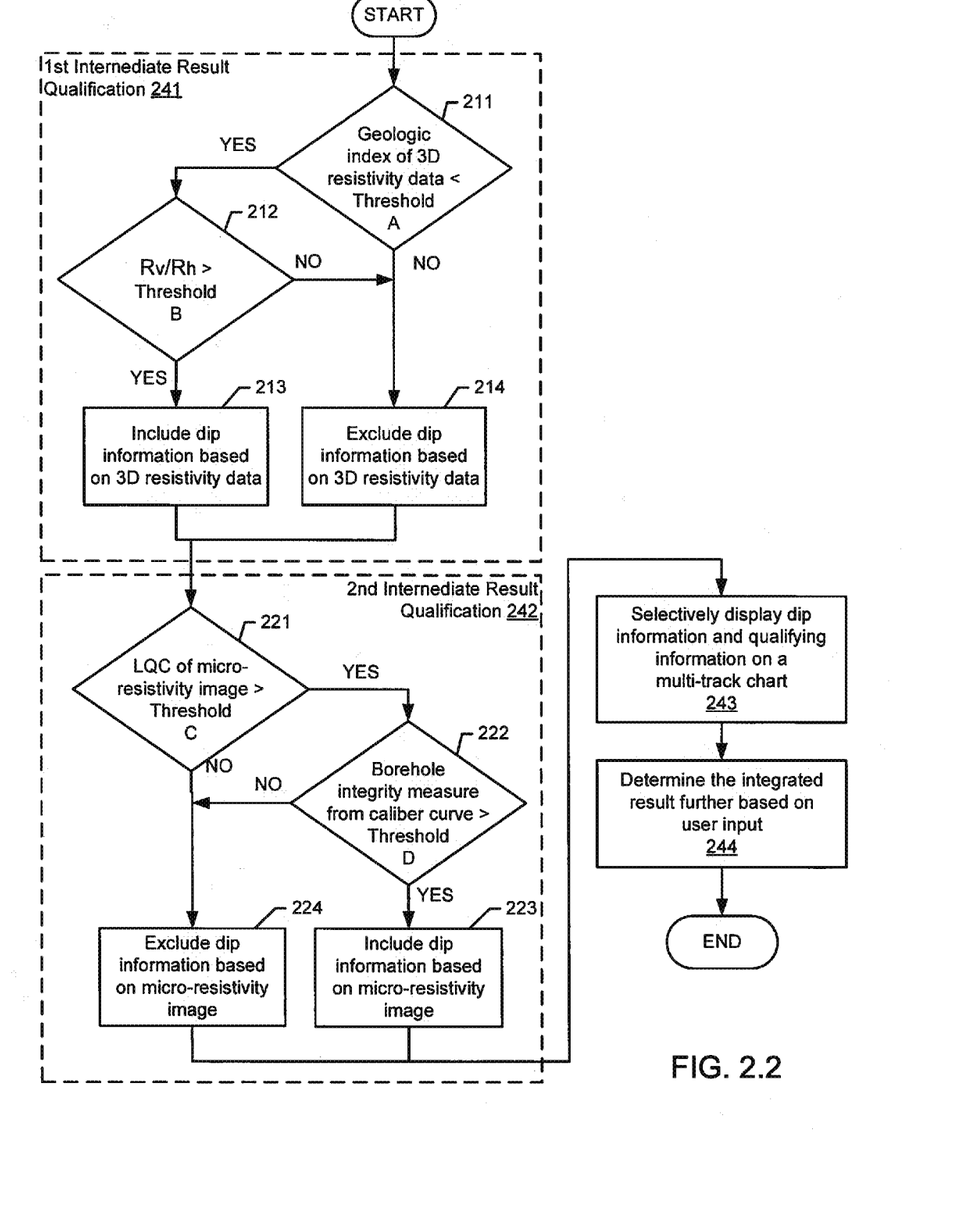

Additional details of the dip integration module (230) are described further in reference to the method depicted in FIGS. 2.1 and 2.2, and the example depicted in FIG. 3 below.

FIG. 2.1 depicts an example method for determining formation dip using 3D resistivity tool and borehole imaging tool in accordance with one or more embodiments. For example, the method depicted in FIG. 2.1 may be practiced using the integrated dip determination system (208) described in reference to FIGS. 1.1 and 1.2 above. In one or more embodiments, one or more of the elements shown in FIG. 2.1 may be omitted, repeated, and/or performed in a different order. Accordingly, embodiments of determining formation dip using 3D resistivity tool and borehole imaging tool should not be considered limited to the specific arrangements of elements shown in FIG. 2.1.

Initially in Element 201, a first intermediate result describing the dip of the geological structure is generated, using a 3D resistivity analyzer configured on a computer system, based on 3D resistivity data collected from a borehole penetrating the subterranean formation.

In Element 203, a second intermediate result describing the dip of the geological structure is generated, using a micro-resistivity image analyzer configured on the computer system, based on a micro-resistivity image collected from the borehole. As noted above, borehole imaging tool may also include density imaging tool, acoustic imaging tool, gamma-ray imaging tool, photo-electric factor imaging tool, etc. that generates various types of borehole images. In one or more embodiments, the second intermediate result may also describe the dip of the geological structure as generated based on these alternative types of borehole images collected from these alternative borehole imaging tools. In one or more embodiments, the micro-resistivity image analyzer may be substituted by a different type of borehole image analyzer.

In Element 205, an integrated result describing the dip of the geological structure is generated, using a dip integration module configured on the computer system, by analyzing the first intermediate result and the second intermediate result based on a pre-determined criterion.

In one or more embodiments, the first intermediate result and the second intermediate result are presented (e.g., displayed) to the user (e.g., a geologist) along with pre-determined sets of quality control parameters. By visually correlating the presented information, the user may select one or both of the first and second intermediate results for any particular location (e.g., depth in the borehole) as the final result. Accordingly, such user involved interpretation process generates the integrated formation dip based on the two sources and is used in further dip based geological evaluation.

In one or more embodiments, dips from the 3D resistivity data are used in the shales while dips from the micro-resistivity data are used in sands. In certain cases, the selection of whether to use dips from the 3D resistivity data or dips from the micro-resistivity data is performed automatically for a particular zone in the wellbore. In other situations, depending on data quality, dips from the two analyzers may be selected manually in the different zones. Whether selected automatically or manually, the selection may be based on quality control parameters such as the ratio of $R_v/R_h$, (where $R_v$ is resistivity perpendicular to bedding and $R_h$ is resistivity parallel to bedding) or the Geologic-Index curve (deviation from 1-Dimensionality of formation) from the 3D resistivity data, as well as the log quality control (LQC) curves and the caliper curves for the micro-resistivity data. Additional information on the dips that can be used to qualify dips includes the spread of dip values within a zone. Throughout this disclosure, the aforementioned geologic index (also known as heterogeneity index), the ratio of $R_v/R_h$, the LQC curves, and the caliper curves, are referred to as qualifying information, based on which determinations to include or exclude dip information from different sources are made. Additional qualifying information are described in reference to the example depicted in FIG. 3 below.

FIG. 2.2 depicts an example implementation for the Element 203 of FIG. 2.1 in accordance with one or more embodiments. In one or more embodiments, one or more of the elements shown in FIG. 2.2 may be omitted, repeated, and/or performed in a different order. Accordingly, embodiments of determining formation dip using 3D resistivity tool and borehole imaging tool should not be considered limited to the specific arrangements of elements shown in FIG. 2.2.

As shown in FIG. 2.2, the method includes a first intermediate result qualification (241) where determinations are made to include or exclude the dip information based on the 3D resistivity data for a particular section of the borehole (referred to as a zone), and a second intermediate result qualification (242) where determinations are made to include or exclude the dip information based on the micro-resistivity image (or any other type of aforementioned borehole image) for the particular zone. In one or more embodiments, the dip information includes the dip magnitude and the dip azimuth.

Initially, within the first intermediate result qualifying branch (241) in Element 211, a geologic index value associated with the 3D resistivity data within a zone is analyzed to determine whether the geologic index value is less than a pre-determined threshold A. In one or more embodiments, the geologic index value represents a measure of dimensionality of the geological structure.

If the determination is yes in Element 211, when the geologic index value within the zone (e.g., a first portion of the borehole) is less than the pre-determined threshold A indicating 1-dimension geological structure, the method proceeds to Element 212 where the dip information based on the 3D resistivity data for the zone is further qualified and included in the integrated result if it also meets additional criteria of the Element 212.

If the determination is no in Element 211, when the geologic index value within the zone (e.g., a second portion of the borehole) exceeds the pre-determined threshold A indicating multi-dimension geological feature, the method proceeds to Element 214 where the dip information based on the 3D resistivity data for the zone is excluded from the integrated result before the method proceeds to Element 243.

In Element 212, a ratio of a perpendicular component of the 3D resistivity data to a parallel component of the 3D resistivity data is analyzed to determine whether the ratio exceeds a pre-determined threshold. In one or more embodiments, the perpendicular and parallel components are with respect to a direction of a bedding in the subterranean formation, thus the ratio represents a measure of anisotropy in the subterranean formation.

If the determination is yes in Element 212, when the ratio within the zone (e.g., a first portion of the borehole) exceeds the pre-determined threshold B, the method proceeds to Element 213 where the dip information based on the 3D resistivity data for the zone is included in the integrated result before the method proceeds to Element 243. In one or more embodiments, the dip information based on the 3D resistivity data for the zone is included in the integrated result if it also meets certain other criteria described in reference to the example depicted in FIG. 3 below.

If the determination is no in element 212, when the ratio within the zone (e.g., a second portion of the borehole) is less than the pre-determined threshold B, the method proceeds to Element 214 where the dip information based on the 3D resistivity data for the zone is excluded from the integrated result before the method proceeds to Element 243.

Further, within the second intermediate result qualifying branch (242) in Element 221, a LQC of the micro-resistivity image within a zone is analyzed to determine whether the LQC exceeds a pre-determined threshold C. In one or more embodiments, the LQC is data quality of all micro-resistivity sensors that generates the micro-resistivity image. The microresistivity imaging data acquired includes data to determine the quality of the image acquisition. The microresistivity imaging tool LQC data is presented as a 2-Dimensional image in Track 7 (FIG. 3). This representation is a collection of data quality of all sensors in each of the pads of the microresistivity imaging tool. The LQC Track consists of bars representing the tool pads. The LQC track displays each bar using different colors or hatch patterns related to an assigned mathematical value dependent of the phase relationship in the electrical data. In one or more embodiments, a first color/hatch pattern indicates good quality data, a second color/hatch pattern indicates marginal quality data, a third color/hatch pattern indicates poor data, and a fourth color/hatch pattern indicates pad lift-off from the borehole wall, i.e., poor quality image. This representation is an useful tool in determining the validity of the data and hence the dips. In one or more embodiments, dips from zones with LQC other than the first color/hatch pattern are not included in the final integration. In these zones, the dips from the 3D resistivity tool will be used provided they meet all other requirements.

If the determination is yes in Element 221, when the LQC within the zone (e.g., a second portion of the borehole) exceeds the pre-determined threshold C, the method proceeds to Element 222 where the dip information based on the micro-resistivity image for the zone is further qualified and included in the integrated result if it also meets additional criteria of the Element 222.

If the determination is no in Element 221, when the LQC within the zone (e.g., a first portion of the borehole) is less than the pre-determined threshold C, the method proceeds to Element 224 where the dip information based on the micro-resistivity image for the zone is excluded from the integrated result before the method proceeds to Element 243.

In Element 222, a caliper curve of the borehole within a zone is analyzed to determine whether a borehole integrity measure derived from the caliper curve exceeds a pre-determined threshold D. As noted above, the borehole integrity measure indicates competency or deterioration of the borehole wall, such as washed out, spiraling, or rugose (uneven), etc. that correlates with a quality level of the micro-resistivity image.

If the determination is yes in Element 222, when the borehole integrity measure within a zone (e.g., a second portion of the borehole) exceeds the pre-determined threshold D, the method proceeds to Element 223 where the dip information based on the micro-resistivity image for the zone is included in the integrated result before the method proceeds to Element 243. Said in other words, the dip information based on the micro-resistivity image for the zone is included in the integrated result if it also meets certain other criteria.

If the determination is no in Element 222, when the borehole integrity measure within the zone (e.g., a first portion of the borehole) is less than the pre-determined threshold D, the method proceeds to Element 224 where the dip information based on the micro-resistivity image for the zone is excluded from the integrated result before the method proceeds to Element 243.

In one or more embodiments, the aforementioned pre-determined threshold A, threshold B, threshold C, and threshold D are determined prior to analyzing the 3D resistivity data and/or the micro-resistivity data.

In Element 243, dip information and qualifying information are selectively displayed on a multi-track chart. In one or more embodiments, the dip information are displayed in the original format prior to applying the first intermediate result qualifying branch (241) and the second intermediate result qualifying branch (242). In one or more embodiments, the dip information are displayed in the qualified format after applying one or both of the first intermediate result qualifying branch (241) and the second intermediate result qualifying branch (242). In one or more embodiments, the dip information in both the original format and the qualified format are displayed. In one or more embodiments, the results from Elements 213, 214, 223, and 224 are combined and displayed in a single track as an auto-integrated result track.

In one or more embodiments, the qualifying information includes the geologic index value associated with the 3D resistivity data, the ratio of the perpendicular component and the parallel component of the 3D resistivity data, the LQC of the micro-resistivity image, and the caliper curve(s). Additional details of the multi-track chart are described in reference to the example shown in FIG. 3 below.

In Element 244, the integrated result is determined further based on the user input. In one or more embodiments, the aforementioned auto-integrated result track is used as a reference along with all other displayed tracks and presented to the user for final determination. An example of determining the integrated result further based on the user input is shown in FIG. 3 below.

Although Elements 211, 212, 221, and 222 are shown in a particular sequence in FIG. 2.2, they may be performed in any order. For example, the second intermediate result qualification (242) may be performed before the first intermediate result qualification (241). Further, additional qualifying criteria may be included. For example, the first intermediate result and the second intermediate result may be compared to determine a consistency measure, where the second intermediate result for the zone is included in the integrated result when the consistency measure within the zone exceeds a pre-determined threshold. This is due to general higher resolution content of the micro-resistivity image based dip information. Using a fractured formation as an example, when a fracture or fractures create enough anisotropy in the formation the 3D resistivity tool will respond to the fractures. In some cases, the dips from the 3D resistivity tool give the orientation of the fractures instead of the formation dip. In such cases, the first intermediate result and the second intermediate result become inconsistent in one or more embodiments.

Further, although the method described with respect to FIGS. 2.1 and 2.2 are based on using the micro-resistivity image, those skilled in the art, with the benefit of this disclosure will appreciate that other types of borehole image (e.g., density image, acoustic image, gamma-ray image, photo-electric factor image, etc. of the borehole) may also be used.

Figure 3:
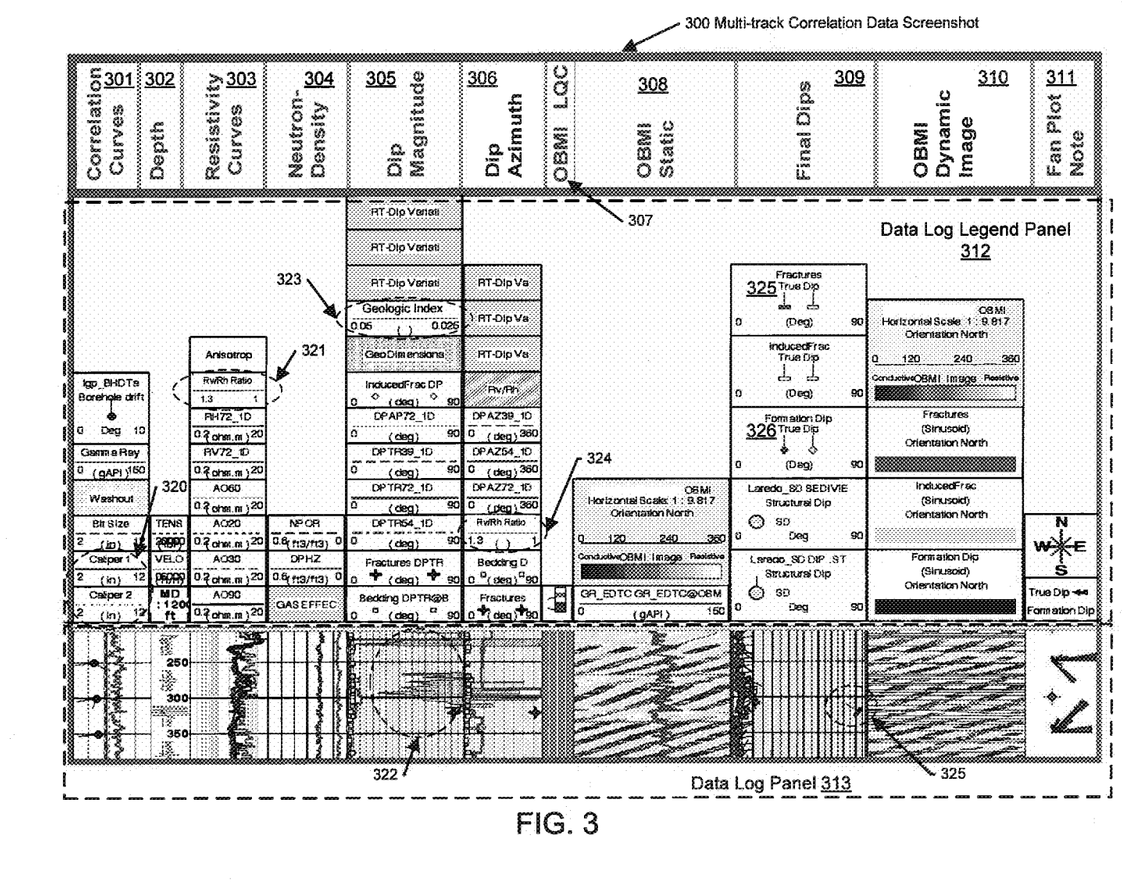
FIG. 3 depicts an example for determining formation dip using 3D resistivity tool and borehole imaging tool in accordance with one or more embodiments.

FIG. 3 depicts a multi-track correlation data screenshot (300) that further illustrates generating formation dip by combining results from the 3D resistivity tool and micro-resistivity imaging tool in accordance with one or more embodiments.

The multi-track correlation data screenshot (300) is an example of final presentation to be displayed to the user (e.g., a geologist). In one example, the user makes the final selection of 3D resistivity data based dip or micro-resistivity images based dip by visually examining the presented multi-track correlation data. In another example, the user reviews the automatically generated integrated dip based on the presented multi-track correlation data. Whether combined manually or automatically, the criteria for combining results from the 3D resistivity tool and micro-resistivity imaging tool may include:
1. Geologic Index Curve
2. $R_v/R_h$ ratio curve
3. Calipers
4. The OBMI Log Quality Control (LQC)
5. Visual Inspection of images
6. Matching dips from both tools.

As shown in FIG. 3, the multi-track correlation data screenshot (300) includes the first track (301) through the $11^{th}$ track (311) where track information is organized in the data log legend panel (312) and the data log panel (313). Specifically, eleven data logs corresponding to the eleven tracks are shown in the data log panel (313). Further, data log legends describing how one or more data trace(s) are presented in each data log are shown in the data log legend panel (312). For example, the data trace(s) may be represented using different shapes, cross-hatch patterns, shadings, colors, etc. This organization presents a new illustration mode for dip representation.

In the first track (301) (i.e., Correlation Curves) are bit size, caliper, borehole deviation and gamma ray curves.

In the second track (302) (i.e., Depth) are depth values, tension and tool velocity curves.

The third track (303) (i.e., Resistivity Curves) has all the standard resistivity curves plus an $R_h$ (resistivity parallel to bedding) and an $R_v$ (Resistivity perpendicular to bedding) ratio curve identified by the $R_v/R_h$ legend (321)

The fourth track (304) (i.e., Neutron-Density) is the porosity track.

The fifth track (305) (i.e., Dip Magnitude) has dip magnitude displays as well as the Geologic Index curve (322) (having right to left scale from 0.025 to 0.05 that is identified by the legend (323)) as geological events deviate further from being 1-dimensional. In the fifth track (305), the magnitudes of dip from different depths of investigation (39, 54, and 72 inches) of the 3D resistivity data (e.g., RT scanner data) are displayed using lines/curves, whereas the magnitudes of dips (bedding, fractures, etc.) from the borehole imaging tool (e.g., OBMI) are displayed using squares.

The sixth track (306) (i.e., Dip Azimuth) has dip azimuths as well as the $R_v/R_h$ ratio curve (having right to left scale from 1.0 to 1.3 that is identified by the legend (324)) with shading when the value of $R_v/R_h$ ratio drops to less than 1.3. In the sixth track (306), the azimuths of dips from the 3D resistivity data are displayed using lines/curves, whereas the azimuth of dips (bedding, fractures, etc.) from the imaging tool are displayed using squares.

The seventh track (307) (i.e., OBMI LQC) are the quality control curves of the borehole images (e.g., OBMI images).

The eighth track (308) has a static OBMI image.

The ninth track (309) (i.e., Final Dips) are the final dip sets. In one or more embodiments, the final dip sets are automatically combined dips from RT scanner dips and OBMI image dips. In one or more embodiments, the final dip sets are manually combined dips as selected by the user from RT scanner dips and OBMI image dips.

The tenth track (310) (i.e., OBMI Dynamic Image) displays the dynamic OBMI image and the sinusoids corresponding to the dips.

The eleventh track (311) displays fan plots or other interpretation notes.

In one or more embodiments, the tracks may be arranged in a different manner. In one or more embodiments, the display may include other tracks, or may exclude some of those that are presented here.

Typically, dip from imaging tools is represented by tadpoles (e.g., tadpole (325)), where the magnitude is the distance of the head of the tadpole from the left edge of the track (which is typically 0 to 90 degrees from left to right), and the dip azimuth is represented by the direction of the tail of the tadpole (North is upwards and direction goes clockwise through East, South, West and back to North). A dip tadpole could represent many geological features including bedding planes, fractures, faults, etc. The highlight pattern/shading and shape of the head of the tadpoles are chosen appropriately to represent the various features.

3D resistivity data based dip tadpoles represent a volume of rock rather than a plane, it is not appropriate to represent them with a single tadpole at a particular depth, hence dips obtained by the 3D resistivity data are represented by separate curves of dip magnitude and dip azimuth.

Accurately comparing the dip magnitudes from tadpoles of the micro-resistivity images with the dip magnitude curve from the 3D resistivity data is made possible by displaying the two in the same track using the same scale (i.e., 0-90), however, accurately comparing dip azimuths from tadpoles of the micro-resistivity images with the dip magnitude curve from the 3D resistivity data is difficult due to different scale representations. In particular, the azimuth curve is on a scale of 0-360 degrees while the tadpoles point upwards to indicate North, downwards for South, right for East, and left for West.

In order to resolve this issue, a new illustration mode is used in the multi-track correlation data screenshot (300) for displaying dip tadpoles as separated into two components, which are dip magnitude and dip azimuth. As can be seen in Track 5 (305) (i.e., dip magnitude track), small squares are plotted in the track such that the distance of the squares from the left edge of the track (which is typically 0 to 90 degrees from left to right) represents the dip magnitude. This allows easy and accurate comparison of the micro-resistivity image based dip magnitude with the dip magnitude curves of the 3D resistivity data. In a similar manner, as can be seen from Track 6 (306) (i.e., dip azimuth track), small squares are plotted in the track such that the distance of the squares from the left edge of the track (which is 0 to 360 degrees from left to right) represents the dip azimuth. This allows easy and accurate comparison of the micro-resistivity image based dip azimuths with the dip azimuth curves of the 3D resistivity data.

Based on this new mode for dip representation, example criteria for dip integration are illustrated below. Once the dips have been computed/determined for the data zone of interest in the borehole from the 3D resistivity data and the micro-resistivity images, the dips are analyzed and interpreted individually and as a group. In order to accomplish this, the dips from the two sources (i.e., 3D resistivity data and micro-resistivity images) are examined for their quality and their meaning. The dips are then integrated using several criteria to represent the various geological features present in a particular zone being examined in the borehole. As noted above, the criteria for integration of dip may include:

1. Geologic Index Curve
2. $R_v/R_h$ ratio curve
3. Calipers
4. The OBMI Log Quality Control (LQC)
5. Visual Inspection of images
6. Matching dips from both tools.

Each of the criteria mentioned above is discussed below. Note that multiple criteria and factors are considered in the final integration.

1. Geologic Index Curve

In Track 5 (305) (i.e., Dip Magnitude), where the Geologic Index curve (322) of the 3D resistivity data (and associated shading) is visible (i.e., values greater than 0.025), the dimensionality of the geological features is greater than one. This indicates the presence of fractures, faults, slumps, debris flows, cross-beds, nodules, bioturbation, etc. In this case, dips from the 3D resistivity data would not be considered as the bedding dip in one or more embodiments. An image analysis is performed to identify what geological feature might be influencing the 3D resistivity data based dips. Accordingly, the dip from the 3D resistivity data may be assigned to the category of fractures, faults, etc. It should be noted that the number 0.025 is a threshold, and may vary from situation to situation.

On the other hand, if the Geologic Index values are less than or equal to 0.025, the geological features are one-dimensional, which implies that the dips represent beds. The dips from the 3D resistivity data for these zones may be used for the final integration. In one or more embodiments, the dips from the 3D resistivity data for these zones must comply with all the other criteria in order to be used for the final integration.

2. $R_v/R_h$ Ratio Curve

The sixth track (306) (i.e., Dip Azimuth) includes the $R_v/R_h$ ratio curve (having right to left scale from 1.0 to 1.3 that is identified by the legend (324)), from the 3D resistivity data. $R_v/R_h$ ratio less than 1.3 implies that the formation does not have enough anisotropy, meaning that the formation is approaching the situation where the electrical properties are same in all directions. In such situations, the computation of dip from the 3D resistivity data is not reliable, and hence the dip data in these situations is not considered for integration. It should be noted that the number 1.3 is a threshold, and may vary from situation to situation.

On the other hand, $R_v/R_h$ ratio greater than or equal to 1.3 implies anisotropy in the formation and indicates that the dips represent beds. The dips from the 3D resistivity data for these zones may be used for the final integration. In one or more embodiments, the dips from the 3D resistivity data for these zones must comply with all the other criteria in order to be used for the final integration.

3. Calipers

The pads of micro-resistivity imaging tools are also used to measure the borehole diameter at each depth point. Two caliper curves are presented—as seen in Track 1 (301). These are 90 degrees to each other. The caliper curves identified by legends (320) are a good indicator of the competency or deterioration of the borehole wall. A washed out, spiraling or rugose (uneven) section of the borehole may cause pads of micro-resistivity imagers to lose contact with the borehole wall. This, in turn, would cause poor quality in acquired images. Therefore, dips from the micro-resistivity imaging tools for such zones would be of poor quality, and therefore will not be integrated in one or more embodiments. In these zones, because the 3D resistivity data based results are not affected by bad borehole surfaces, the dips from the 3D resistivity data may be used for final integration. In one or more embodiments, the dips from the 3D resistivity data for these zones must comply with all the other criteria in order to be used for the final integration.

4. The Micro-Resistivity Images Log Quality Control (LQC)

The micro-resistivity data includes data to determine the quality of the image acquisition. The micro-resistivity images LQC data is presented as a 2-Dimensional image in Track 7 (307). For example, this representation is a collection of data quality of all five sensors in each of the four pads of the OBMI. The micro-resistivity images LQC data consists of four bars representing the four tool pads, and each bar consists of five sub-bars each representing the five button pairs on each pad. Different colors or hatch patterns are used to display these bars and sub-bars to highlight good quality data, marginal quality data, poor data, and un-acceptable data (e.g., due to pad lift-off from the borehole wall). This representation facilitates determining the validity of the data and hence the dips. Dips from zones with marginal quality data, poor data, and un-acceptable data are not included in the final integration. In these zones, the dips from the 3D resistivity data may be used. In one or more embodiments, the dips from the 3D resistivity data for these zones must comply with all the other criteria in order to be used for the final integration.

5. Visual Inspection of Images

Apart from all the data quality factors mentioned above, there are factors present in the images that may cause the user to reject certain dips obtained from the micro-resistivity images even when LQC indicates good image data. For example, there are zones, especially in shales, where due to the contact of the oil base muds, the shales get desiccated. The desiccation cracks mask the geological events, thus what gets imaged are the desiccation cracks rather than the geologic event. Dips from such zones are also not used in the integrated results in one or more embodiments. If images are good and show evidence of non-1-dimensional geological activity such as debris flows, cross-beds, nodules, bioturbation, etc., then dips from the 3D resistivity data would not be used even if they are not flagged by the Geologic Index curve and/or the $R_v/R_h$ curve in one or more embodiments.

6. Matching Dips from Both Tools

Where dips from both tools match, dips will be taken from the micro-resistivity images because of the higher resolution and hence higher frequency of the dips. As described above, using a fractured formation as an example, when a fracture or fractures create enough anisotropy in the formation, the 3D resistivity tool will respond to the fractures. In some cases, the dips from the 3D resistivity tool may provide the orientation of the fractures instead of the formation dip. The dip response from the 3D resistivity tool starts by matching the bedding dip from the image. If logging upwards and continuing into a zone of fractures, the 3D resistivity tool starts combining the response from the formation bedding dip and the fracture dip for the lower portion of the fractured interval and the curves may represent neither the formation dip nor the fracture dip. Continuing upwards into the fractured zone, the 3D resistivity tool may start responding to only the fracture dip if the fractures provide a strong resistivity contrast from the background resistivity. Here the dips obtained would represent the dip of the fractures. Continuing upwards, as the tool comes out of the fractured zone, the 3D resistivity tool starts combining the response from the fracture dip and the background formation bedding dip, and again the curves may represent neither the formation dip nor the fracture dip. Continuing upwards, as the tool moves away from the fractured zone, the 3D resistivity tool again measures only formation dip. Based on the examination of the dips and the quality criteria, the results are selectively combined in the integrated track. In one or more embodiments, a final dip set exists for the bedding dip and a final dip set exists for the fracture dip as shown in FIG. 3 and identified based on the legends (325) and (326). Other dip sets may be assigned to appropriate geological surfaces as needed.

The example above describes displaying the dip data to a user, such as a geologist. In another example, such dip data may also be sent to a computer controlling a drilling mechanism. For example, the dip data, or an alert generated therefrom, may cause the computer controlling the drilling mechanism to change the direction or otherwise adjust the drilling operation. One skilled in the art, with the benefit of this disclosure, will appreciate that the dip data may also be used to adjust other operations of the field.

Figure 4:
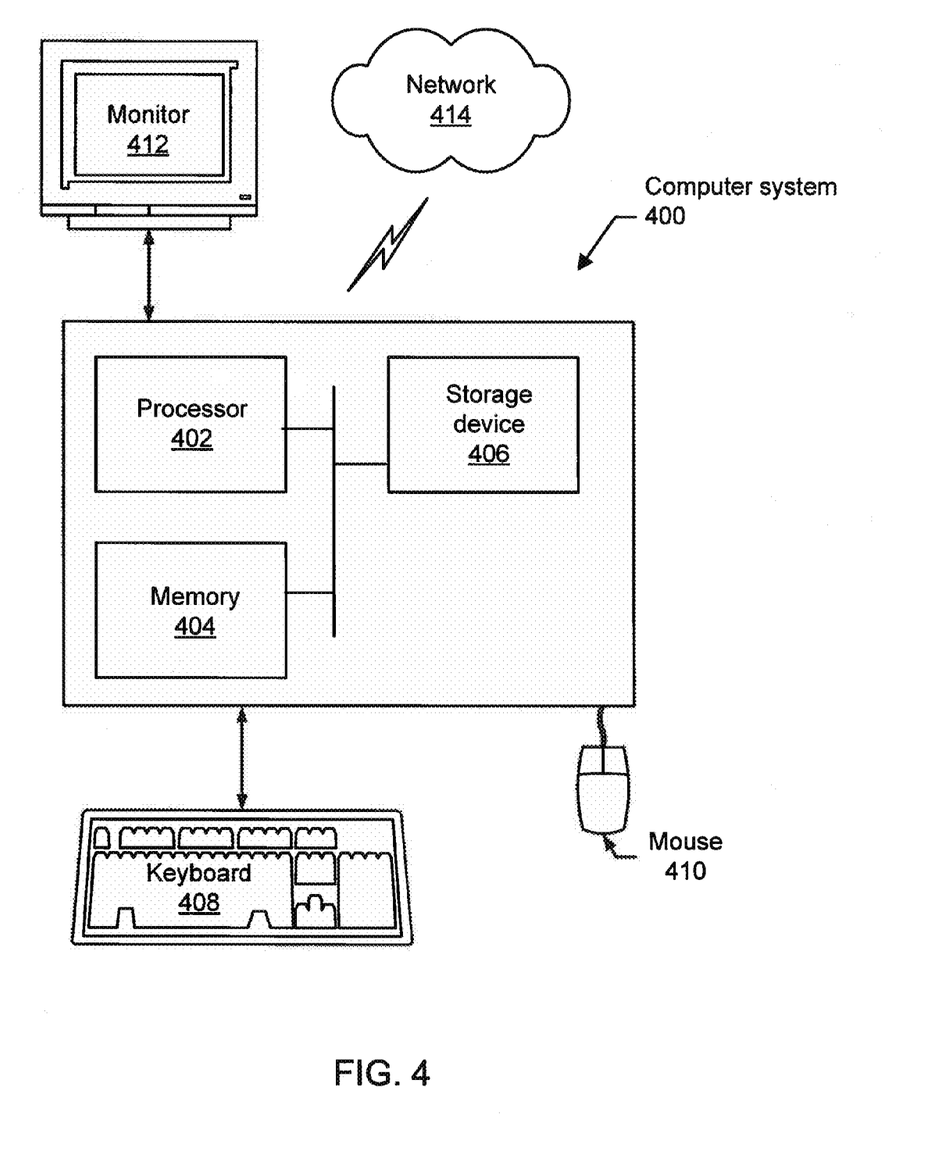
FIG. 4 depicts a computer system using which one or more embodiments of determining formation dip using 3D resistivity tool and borehole imaging tool may be implemented.

Embodiments of determining formation dip using 3D resistivity tool and borehole imaging tool may be implemented on virtually any type of computer regardless of the platform being used. For instance, as shown in FIG. 4, a computer system (400) includes one or more processor(s) (402) such as a central processing unit (CPU) or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation (e.g., the 3D resistivity analyzer (231), micro-resistivity image analyzer (232), dip integration module (230), etc.) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While determining formation dip using 3D resistivity tool and borehole imaging tool has been described with respect to a limited number of embodiments, those skilled in the art, having benefit of this disclosure, will appreciate that other embodiments may be devised which do not depart from the scope of determining formation dip using 3D resistivity tool and borehole imaging tool as disclosed herein. Accordingly, the scope of determining formation dip using 3D resistivity tool and borehole imaging tool should be limited only by the attached claims.

What is claimed is:

1. A method for determining a dip of at least part of a geological structure in a subterranean formation, comprising:

obtaining 3D resistivity data and a borehole image, wherein the 3D resistivity data and the borehole image were acquired using at least one data acquisition tool in a borehole penetrating the subterranean formation;

generating, using a 3D resistivity analyzer, a first intermediate result describing the dip based on the 3D resistivity data;

generating, using a borehole image analyzer, a second intermediate result describing the dip based on the borehole image; and generating, by a computer processor combining the first intermediate result and the second intermediate result based on a pre-determined criterion, an integrated result describing the dip based at least in part on a combination of the first intermediate result and the second intermediate result, wherein generating the integrated result comprises:

calculating a geologic index value associated with the 3D resistivity data to determine whether the geologic index value is less than a first pre-determined threshold, wherein the geologic index value represents a measure of dimensionality of the geological structure;

including, when the geologic index value within a first portion of the borehole is less than the first pre-determined threshold, the first intermediate result for the first portion of the borehole in the integrated result; and excluding, when the geologic index value within a second portion of the borehole exceeds the first pre-determined threshold, the first intermediate result for the second portion of the borehole from the integrated result, wherein the integrated result describing the dip is configured to be used by a controller to control a drilling direction of a borehole.

2. The method of claim 1, wherein generating the integrated result further comprises:
calculating a ratio of a perpendicular component of the 3D resistivity data to a parallel component of the 3D resistivity data to determine whether the ratio exceeds a second pre-determined threshold, wherein the ratio represents a measure of anisotropy in the subterranean formation;
including, when the ratio within the first portion of the borehole exceeds the second pre-determined threshold, the first intermediate result for the first portion of the borehole in the integrated result; and
excluding, when the ratio within the second portion of the borehole is less than the pre-determined threshold, the first intermediate result for the second portion of the borehole from the integrated result.

3. The method of claim 1, wherein generating the integrated result further comprises:
analyzing a caliper curve of the borehole to determine whether a borehole integrity measure derived from the caliper curve exceeds a second pre-determined threshold, wherein the borehole integrity measure correlates with a quality level of the borehole image;
selectively including, when the borehole integrity measure within the second portion of the borehole exceeds the second pre-determined threshold, the second intermediate result for the second portion of the borehole in the integrated result; and
excluding, when the borehole integrity measure within the first portion of the borehole is less than the second pre-determined threshold, the second intermediate result for the first portion of the borehole from the integrated result.

4. The method of claim 1, wherein generating the integrated result further comprises:
analyzing a log quality control (LQC) measure of the borehole image to determine whether the LQC measure exceeds a second pre-determined threshold, wherein the LQC measure correlates with a quality level of the borehole image;
selectively including, when the LQC measure within the second portion of the borehole exceeds the second pre-determined threshold, the second intermediate result for the second portion of the borehole in the integrated result; and
excluding, when the LQC measure within the first portion of the borehole is less than the second pre-determined threshold, the second intermediate result for the first portion of the borehole from the integrated result.

5. The method of claim 1, wherein generating the integrated result further comprises:
comparing the first intermediate result and the second intermediate result to determine a consistency measure; and
including, when the consistency measure within the first portion of the borehole exceeds a second pre-determined threshold, the second intermediate result in the integrated result.

6. The method of claim 1, further comprising:
displaying the first intermediate result and the second intermediate result in at least one data log track of a plurality of tracks;
displaying at least one selected from a group consisting of the geologic index value associated with the 3D resistivity data, a ratio of a perpendicular component of the 3D resistivity data to a parallel component of the 3D resistivity data, a log quality control (LQC) measure of the borehole image, and a caliper curve of the borehole in a reference track of the plurality of tracks, wherein the ratio represents a measure of anisotropy in the subterranean formation, and at least one selected from a group consisting of the LQC measure and the caliper curve correlates with a quality level of the borehole image; and
receiving an input from a user in response to the user viewing the plurality of tracks,
wherein at least one selected from a group consisting of the first intermediate result and the second intermediate result within the first portion of the borehole is included in the integrated result based on the user input.

7. The method of claim 6, wherein the at least one data log track and the reference track are combined to superimpose the geologic index value over dip magnitude information of the at least one data log track.

8. The method of claim 6, wherein the at least one data log track and the reference track are combined to superimpose the ratio over dip azimuth information of the at least one data log track.

9. The method of claim 1, further comprising determining that the geological structure comprises a fracture, a fault, a slump, a debris flow, a cross-bed, a nodule, a bioturbation, or a combination thereof in response to the dimensionality of the geological structure being greater than one.

10. The method of claim 1, further comprising determining that the geological structure comprises a bed in response to the geological structure being one dimensional.

11. The method of claim 1, wherein the dimensionality of the geological structure is greater than one when the geologic index value is greater than the first pre-determined threshold, and wherein the geological structure is one dimensional when the geologic index value is less than the first pre-determined threshold.

12. A system for determining a dip of at least a part of a geological structure in a subterranean formation, comprising:
a computer processor and memory;
a 3D resistivity analyzer stored in the memory, executing on the computer processor, and configured to generate a first intermediate result describing the dip based on 3D resistivity data collected from a borehole penetrating the subterranean formation using a 3D resistivity tool positioned in the borehole;
a borehole image analyzer stored in the memory, executing on the computer processor, and configured to generate a second intermediate result describing the dip based on a borehole image collected from the borehole using a borehole imaging tool positioned in the borehole;
a dip integration module stored in the memory, executing on the computer processor, and configured to generate an integrated result describing the dip based on a combination of the first intermediate result and the second intermediate result, by combining the first intermediate result and the second intermediate result based on a pre-determined criterion, wherein, to generate the integrated result, the dip integration module is configured to perform operations, the operations comprising:
obtaining the 3D resistivity data and the borehole image;
calculating a geologic index value associated with the 3D resistivity data to determine whether the geologic index value is less than a pre-determined threshold, wherein the geologic index value represents a measure of dimensionality of the geological structure;

including, when the geologic index value within a first portion of the borehole is less than the pre-determined threshold, the first intermediate result for the first portion of the borehole in the integrated result;

excluding, when the geologic index value within a second portion of the borehole exceeds the pre-determined threshold, the first intermediate result for the second portion of the borehole from the integrated result; and a repository configured to store the first intermediate result, the second intermediate result, and the integrated result describing the dip of the geological structure, wherein the integrated result describing the dip is configured to be used by a controller to control a drilling direction of a borehole.

13. The system of claim 12, wherein the operations further comprise:

analyzing a ratio of a perpendicular component of the 3D resistivity data to a parallel component of the 3D resistivity data to determine whether the ratio exceeds a second pre-determined threshold, wherein the ratio represents a measure of anisotropy in the subterranean formation;

including, when the ratio within the first portion of the borehole exceeds the second pre-determined threshold, the first intermediate result for the first portion of the borehole in the integrated result; and excluding, when the ratio within the second portion of the borehole is less than the second pre-determined threshold, the first intermediate result for the second portion of the borehole from the integrated result.

14. The system of claim 12, wherein the operations further comprise:

analyzing a caliper curve of the borehole to determine whether a borehole integrity measure derived from the caliper curve exceeds a second pre-determined threshold, wherein the borehole integrity measure correlates with a quality level of the borehole image;

including, when the borehole integrity measure within the second portion of the borehole exceeds the second pre-determined threshold, the second intermediate result for the second portion of the borehole in the integrated result; and excluding, when the borehole integrity measure within the first portion of the borehole is less than the second pre-determined threshold, the second intermediate result for the first portion of the borehole from the integrated result.

15. The system of claim 12, wherein the operations further comprise:

comparing the first intermediate result and the second intermediate result to determine a consistency measure; and including, when the consistency measure within the first portion of the borehole exceeds a second pre-determined threshold, the second intermediate result in the integrated result.

16. The system of claim 12, wherein the operations further comprise:

analyzing a log quality control (LQC) measure of the borehole image to determine whether the LQC measure exceeds a second pre-determined threshold, wherein the LQC measure correlates with a quality level of the borehole image;

selectively including, when the LQC measure within the second portion of the borehole exceeds the second pre-determined threshold, the second intermediate result for the second portion of the borehole in the integrated result; and excluding, when the LQC measure within the first portion of the borehole is less than the second pre-determined threshold, the second intermediate result for the first portion of the borehole from the integrated result.

17. The system of claim 12, further comprising a display device configured to:

display the first intermediate result and the second intermediate result in at least one data log track of a plurality of tracks; and display at least one selected from a group consisting of a geologic index value associated with the 3D resistivity data, a ratio of a perpendicular component of the 3D resistivity data to a parallel component of the 3D resistivity data, a log quality control (LQC) measure of the borehole image, and a caliper curve of the borehole in a reference track of the plurality of tracks, wherein the ratio represents a measure of anisotropy in the subterranean formation, and at least one selected from a group consisting of the LQC measure and the caliper curve correlates with a quality level of the borehole image, wherein the dip integration module is further configured to receive an input from a user in response to the user viewing the plurality of tracks, and wherein at least one selected from a group consisting of the first intermediate result and the second intermediate result within the first portion of the borehole is included in the integrated result based on the user input.

18. A non-transitory computer readable medium storing instructions for determining a dip of at least a part of a geological structure in a subterranean formation, the instructions when executed causing a processor to perform operations, the operations comprising:

obtaining 3D resistivity data and a borehole image, wherein the 3D resistivity data and the borehole image were acquired using at least one data acquisition tool in a borehole penetrating the subterranean formation;

generating, using a 3D resistivity analyzer, a first intermediate result describing the dip based on the 3D resistivity data;

generating, using a borehole image analyzer, a second intermediate result describing the dip based on a borehole image collected from the borehole; and generating, by combining the first intermediate result and the second intermediate result based on a pre-determined criterion, an integrated result describing the dip based on a combination of the first intermediate result and the second intermediate result, comprising:

calculating a geologic index value associated with the 3D resistivity data to determine whether the geologic index value is less than a pre-determined threshold, wherein the geologic index value represents a measure of dimensionality of the geological structure;

including, when the geologic index value within a first portion of the borehole is less than the pre-determined threshold, the first intermediate result for the first portion of the borehole in the integrated result; and excluding, when the geologic index value within a second portion of the borehole exceeds the pre-determined threshold, the first intermediate result for the second portion of the borehole from the integrated result, wherein the integrated result describing the dip is configured to be used by a controller to control a drilling direction of a borehole.

19. The non-transitory computer readable medium of claim 18, wherein generating the integrated result further comprises:
calculating a ratio of a perpendicular component of the 3D resistivity data to a parallel component of the 3D resistivity data to determine whether the ratio exceeds a second pre-determined threshold, wherein the ratio represents a measure of anisotropy in the subterranean formation;
including, when the ratio within the first portion of the borehole exceeds the second pre-determined threshold, the first intermediate result for the first portion of the borehole in the integrated result; and
excluding, when the ratio within the second portion of the borehole is less than the second pre-determined threshold, the first intermediate result for the second portion of the borehole from the integrated result.

20. The non-transitory computer readable medium of claim 18, wherein generating the integrated result further comprises:
analyzing a caliper curve of the borehole to determine whether a borehole integrity measure derived from the caliper curve exceeds a second pre-determined threshold, wherein the borehole integrity measure correlates with a quality level of the borehole image;
selectively including, when the borehole integrity measure within the second portion of the borehole exceeds the second pre-determined threshold, the second intermediate result for the second portion of the borehole in the integrated result; and
excluding, when the borehole integrity measure within the first portion of the borehole is less than the second pre-determined threshold, the first intermediate result for the first portion of the borehole from the integrated result.

21. The non-transitory computer readable medium of claim 18, wherein generating the integrated result further comprises:
analyzing a log quality control (LQC) measure of the borehole image to determine whether the LQC measure exceeds a second pre-determined threshold, wherein the LQC measure correlates with a quality level of the borehole image;
selectively including, when the LQC measure within the second portion of the borehole exceeds the second pre-determined threshold, the second intermediate result for the second portion of the borehole in the integrated result; and
excluding, when the LQC measure within the first portion of the borehole is less than the second pre-determined threshold, the second intermediate result for the first portion of the borehole from the integrated result.

22. The non-transitory computer readable medium of claim 18, wherein generating the integrated result further comprises:
comparing the first intermediate result and the second intermediate result to determine a consistency measure; and
including, when the consistency measure within the first portion of the borehole exceeds the pre-determined threshold, the second intermediate result in the integrated result.

23. The non-transitory computer readable medium of claim 18, wherein the operations further comprise:
displaying the first intermediate result and the second intermediate result in at least one data log track of a plurality of tracks;
displaying at least one selected from a group consisting of the geologic index value associated with the 3D resistivity data, a ratio of a perpendicular component of the 3D resistivity data to a parallel component of the 3D resistivity data, a log quality control (LQC) measure of the borehole image, and a caliper curve of the borehole in a reference track of the plurality of tracks, wherein the ratio represents a measure of anisotropy in the subterranean formation, and at least one selected from a group consisting of the LQC measure and the caliper curve correlates with a quality level of the borehole image; and
receiving an input from a user in response to the user viewing the plurality of tracks,
wherein at least one selected from a group consisting of the first intermediate result and the second intermediate result within the first portion of the borehole is included in the integrated result based on the user input.

24. A method for determining a dip of at least part of a geological structure in a subterranean formation, comprising:
obtaining 3D resistivity data and a borehole image, wherein the 3D resistivity data and the borehole image were acquired using a 3D resistivity tool and a borehole imaging tool, respectively, positioned in a borehole penetrating the subterranean formation;
determining a first result representing the dip based at least in part on the 3D resistivity data;
determining a second result representing the dip based at least in part on the borehole image; and
determining, by a computer processor, a third result representing the dip based at least in part on a combination of the first and second results, wherein determining the third result comprises:
calculating a geologic index value based on the 3D resistivity data, wherein the geologic index value represents a measure of dimensionality of the geological structure;
including, when the geologic index value within a first portion of the borehole is less than a first pre-determined threshold, the first result for the first portion of the borehole in the third result;
excluding, when the geologic index value within a second portion of the borehole exceeds the first pre-determined threshold, the first result for the second portion of the borehole from the third result,
wherein the third result representing the dip is configured to be used by a controller to control a drilling direction of a borehole.

* * * * *